US011245484B2

(12) United States Patent
Bhandari et al.

(10) Patent No.: US 11,245,484 B2
(45) Date of Patent: Feb. 8, 2022

(54) AUTHENTICATING TIME SOURCES USING ATTESTATION-BASED METHODS

(71) Applicant: Cisco Technology, Inc., San Jose, CA (US)

(72) Inventors: Shwetha Subray Bhandari, Bangalore (IN); Frank Brockners, Cologne (DE); Srihari Raghavan, Tamil Nadu (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 48 days.

(21) Appl. No.: 16/790,935

(22) Filed: Feb. 14, 2020

(65) Prior Publication Data

US 2020/0322075 A1    Oct. 8, 2020

Related U.S. Application Data

(60) Provisional application No. 62/829,604, filed on Apr. 4, 2019.

(51) Int. Cl.
*H04J 3/06* (2006.01)
*H04L 9/32* (2006.01)

(52) U.S. Cl.
CPC .......... *H04J 3/0667* (2013.01); *H04J 3/0688* (2013.01); *H04L 9/3297* (2013.01)

(58) Field of Classification Search
CPC ...... H04J 3/0667; H04J 3/0688; H04L 9/3297
See application file for complete search history.

(56) References Cited

U.S. PATENT DOCUMENTS

| 9,763,063 | B2* | 9/2017 | Kumar | H04L 29/06 |
|---|---|---|---|---|
| 2003/0002483 | A1* | 1/2003 | Zwack | G06F 1/14 |
| 2012/0259781 | A1* | 10/2012 | Fote | G06Q 20/40 |
| 2013/0332564 | A1* | 12/2013 | Jones | G06F 15/16 |
| 2016/0345179 | A1* | 11/2016 | Chen | H04W 12/10 |

\* cited by examiner

*Primary Examiner* — Ronald B Abelson
(74) *Attorney, Agent, or Firm* — Polsinelli PC

(57) ABSTRACT

Systems, methods, and computer-readable media for authenticating time sources using attestation-based techniques include receiving, at a destination device, a time reference signal from a source device, the source and destination devices being network devices. The time reference signal can include a time synchronization signal or a time distribution signal. The destination device can obtain attestation information from one or more fields of the time reference signal and determine whether the source device is authentic and trustworthy based on the attestation information. The destination device can also determine reliability or freshness of the time reference signal based on the attestation information. The time reference signal can be based on a Network Time Protocol (NTP), a Precision Time Protocol (NTP), or other protocol. The attestation information can include Proof of Integrity based a Canary stamp, a hardware fingerprint, a Secure Unique Device Identification (SUDI) of the source device, or an attestation key.

20 Claims, 12 Drawing Sheets

700

RECEIVE, AT A DESTINATION DEVICE, A TIME REFERENCE SIGNAL FROM A SOURCE DEVICE, THE DESTINATION DEVICE AND THE SOURCE DEVICE BEING NETWORK DEVICES CONFIGURED TO COMMUNICATE IN A NETWORK
702

OBTAIN, BY THE DESTINATION DEVICE, ATTESTATION INFORMATION FROM ONE OR MORE FIELDS OF THE TIME REFERENCE SIGNAL
704

DETERMINE, BY THE DESTINATION DEVICE, WHETHER THE SOURCE DEVICE IS AUTHENTIC AND TRUSTWORTHY BASED ON THE ATTESTATION INFORMATION
706

FIG. 7

AUTHENTICATING TIME SOURCES USING ATTESTATION-BASED METHODS

CROSS-REFERENCES TO RELATED APPLICATIONS

This application claims the benefit of U.S. Provisional Application No. 62/829,604, filed Apr. 4, 2019, which is hereby incorporated by reference, in its entirety and for all purposes.

TECHNICAL FIELD

The present disclosure generally relates to the field of computer networking, and more particularly to assessing authenticity and trustworthiness of clock sources, as well as reliability of time synchronization signals utilized by one or more devices within a network.

BACKGROUND

Trustworthiness of a given device operating within a network may degrade from the time of its initial configuration. Active measurements may be needed to validate that a device is equivalently trustworthy to the time of its initial deployment. New technologies are adding capabilities which support the secure, real-time reporting of active trustworthiness measurements or evaluation from a remote device. Specifically, all-in-one chips have been used to implement secure boot modules, trust anchor modules, and secure Joint Test Action Group (JTAG) solutions for verifying the trustworthiness of devices. Further, tokens or metadata elements containing security measurements or security evidence have been developed for verifying the trustworthiness of devices.

Based on the results from such technologies, additional analysis and remediation methods can be invoked to reduce/mitigate the effects of attacks. For example, an Integrity Verification application based on a controller can invoke the validating specific portions of device memory. When errors are found during such a check, it allows the Integrity Verification application to implement steps in order for a device to be returned to a good state.

Such memory verification checks are expensive however and such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

Different types of clock synchronization techniques are used for synchronizing the clocks of devices connected to a network. Clock synchronization is an important aspect of ensuring proper functionality of a network. Different time/clock sources or protocols are known in the art and can be used to define how any node or device in a network can synchronize its clock. For example, clock synchronization may be performed using periodic exchange of timestamps between network devices and the time sources. In some protocols, the time sources form a hierarchy and time is distributed from top to bottom with the root of nodes on top synchronized to a reference time source (e.g. time signaled from GPS receiver). The nodes acting as a time source can be authenticated using encryption techniques (e.g., using a symmetric key and public key authentication schemes). However identity authentication of a nodes serving as a time source may not be sufficient. The time source may have become compromised so that the time source may no longer be a trusted entity. A compromised time source can perpetuate harm to the entire network. Any applications relying on proper time synchronization to perform their tasks (e.g. verifying validity of a token and certificates that are time bound) are also likely to be compromised. There therefore exist needs for systems and methods of verifying the trustworthiness of time sources used by networks.

BRIEF DESCRIPTION OF THE FIGURES

To provide a more complete understanding of the present disclosure and features and advantages thereof, reference is made to the following description, taken in conjunction with the accompanying drawings, in which:

FIG. 7 is a flow-chart of an example process for attestation of a time source, in accordance with some implementations;

DETAILED DESCRIPTION

Figure 1:
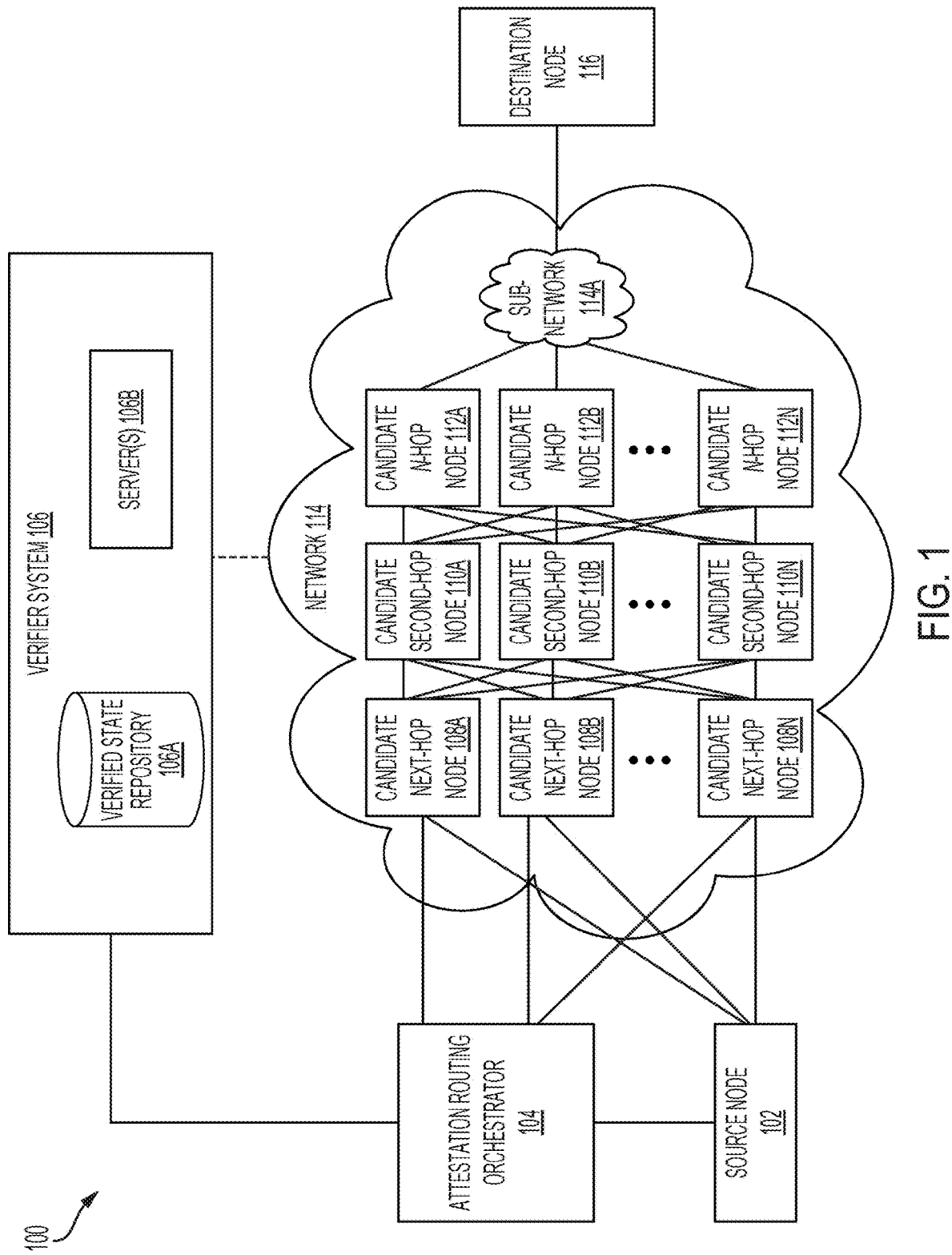
FIG. 1 is a block diagram of an example of a networking environment in accordance with some implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media for authenticating time sources using attestation-based techniques are disclosed. Some examples include receiving, at a destination device, a time reference signal from a source device, the destination device and the source device being network devices. The time reference signal can include a time synchronization signal, a time distribution signal, or other. The destination device can obtain attestation information from one or more fields of the time synchronization signal and determine whether the source device is authentic and trustworthy based on the attestation information. The destination device can also determine reliability or freshness of the time synchronization signal based on the attestation information. The time reference signal can be based on a Network Time Protocol (NTP), a Precision Time Protocol (NTP), or a broadcast signal.

In various examples, metadata elements containing security measurements or evidence can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device, where the canary stamp can indicate or otherwise include a signed measurement associated with a device for verifying trustworthiness of the device. In some examples, the attestation information can include Proof of Integrity based the Canary stamp, a hardware fingerprint, a Secure Unique Device Identification (SUDI) of the source device, or an attestation key.

In some examples, a method is provided. The method includes receiving, at a destination device, a time reference signal from a source device, the destination device and the source device being network devices configured to communicate in a network; obtaining, by the destination device, attestation information from one or more fields of the time reference signal; and determining, by the destination device, whether the source device is authentic and trustworthy based on the attestation information.

In some examples, a system is provided. The system, comprises one or more processors; and a non-transitory computer-readable storage medium containing instructions which, when executed on the one or more processors, cause the one or more processors to perform operations including: receiving, at a destination device, a time reference signal from a source device, the destination device and the source device being network devices configured to communicate in a network; obtaining, by the destination device, attestation information from one or more fields of the time reference signal; and determining, by the destination device, whether the source device is authentic and trustworthy based on the attestation information.

In some examples, a non-transitory machine-readable storage medium is provided, including instructions configured to cause a data processing apparatus to perform operations, the operations including: receiving, at a destination device, a time reference signal from a source device, the destination device and the source device being network devices configured to communicate in a network; obtaining, by the destination device, attestation information from one or more fields of the time reference signal; and determining, by the destination device, whether the source device is authentic and trustworthy based on the attestation information.

Some examples of the methods, systems, and non-transitory machine-readable storage media, further comprise determining reliability or freshness of the time reference signal based on the attestation information.

In some examples of the methods, systems, and non-transitory machine-readable storage media, the time reference signal comprises one or more of a time synchronization signal or a time distribution signal based on a Network Time Protocol (NTP) for time synchronization in the network, with the one or more fields being included in one or more NTP messages.

In some examples of the methods, systems, and non-transitory machine-readable storage media, the one or more NTP messages comprise one or more of an origin timestamp, receive timestamp, transmit timestamp, or destination timestamp, with the one or more fields including one or more extension fields of a packet header of the one or more NTP messages.

In some examples of the methods, systems, and non-transitory machine-readable storage media, the time reference signal comprises one or more of a time synchronization signal or a time distribution signal based on a Precision Time Protocol (PTP) for time synchronization in the network, with the one or more fields being included in one or more PTP messages.

In some examples of the methods, systems, and non-transitory machine-readable storage media, the time reference signal is based on a broadcast signal for time distribution or time synchronization in the network, with the one or more fields being included in the broadcast signal.

In some examples of the methods, systems, and non-transitory machine-readable storage media, the attestation information comprises Proof of Integrity based on one or more of a Canary stamp or a hardware fingerprint comprising Proof of Freshness of the time synchronization signal, a Secure Unique Device Identification (SUDI) of the source device, or an attestation key.

This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

Description of Example Embodiments

The disclosure now turns to an initial discussion of example concepts and technologies for providing verifiable Proof of Integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

While having numerous nodes can increase network connectivity and performance, it also increases security risks as each node that a packet traverses can introduce a risk of unauthorized data access and manipulation. For example, when a packet traverses a node, a security risk may be introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in a battlefield, banking settings, healthcare settings, etc., it is desirable to send such traffic through uncompromised nodes to prevent access to, leakage of, or tampering with the data and sensitive information carried by that traffic. If an attacker gains access to a device via some exploit, previous protection and encryption approaches for network interfaces can be ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks such as Proof-of-Transit (POT) can be implemented to validate or verify that traffic has traversed a specific set of nodes and that such nodes are trusted and uncompromised. In some examples, Trusted Platform Module (TPM), attestation, or Proof of Integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both POT and attestation to offer a secure approach that allows network users or entities to verify that traffic has traversed a defined set of nodes and that such nodes have not been compromised.

In some cases, TPM approaches can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that may have an associated requirement to be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on two or more Roots of Trust, such as the three Roots of Trust in a trusted platform: Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., an RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer 2 (L2) connected devices and maintain these logs in trusted storage. These logs can be protected by embedding a private key into every trust anchor produced for a hardware device and publishing the device's public key as a certificate to peer devices. A peer device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata elements associated with a node to determine that the node should not be trusted and adjust a network policy to mitigate possible damage.

In some implementations, dedicated cryptoprocessors, such as a processor in a TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. Therefore, a receiver of such evidence can be configured to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may be less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various approaches discussed above can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that is expected to be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver is provided with the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer Proof of Integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide Proof of Integrity and Proof of Transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. It may be sufficient for the verifier to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extension of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value II hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value II hash (canary stamp of the node II PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value II hash (canary stamp of the node II TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Having provided an initial discussion of example concepts and technologies for providing explicit verifiable Proof of Integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

Figure 2:
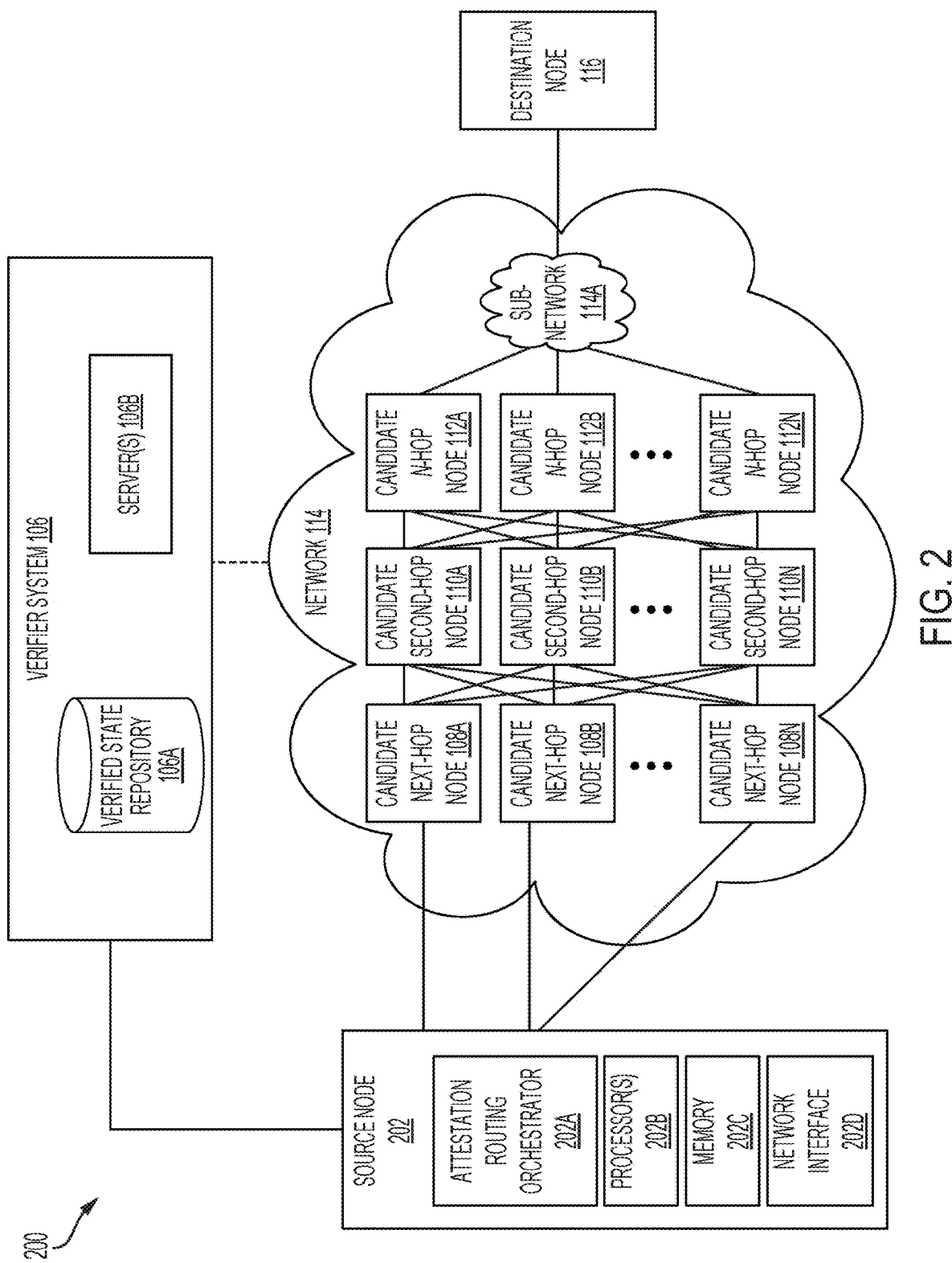
FIG. 2 is a block diagram of an example of a networking environment in accordance with some implementations.

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
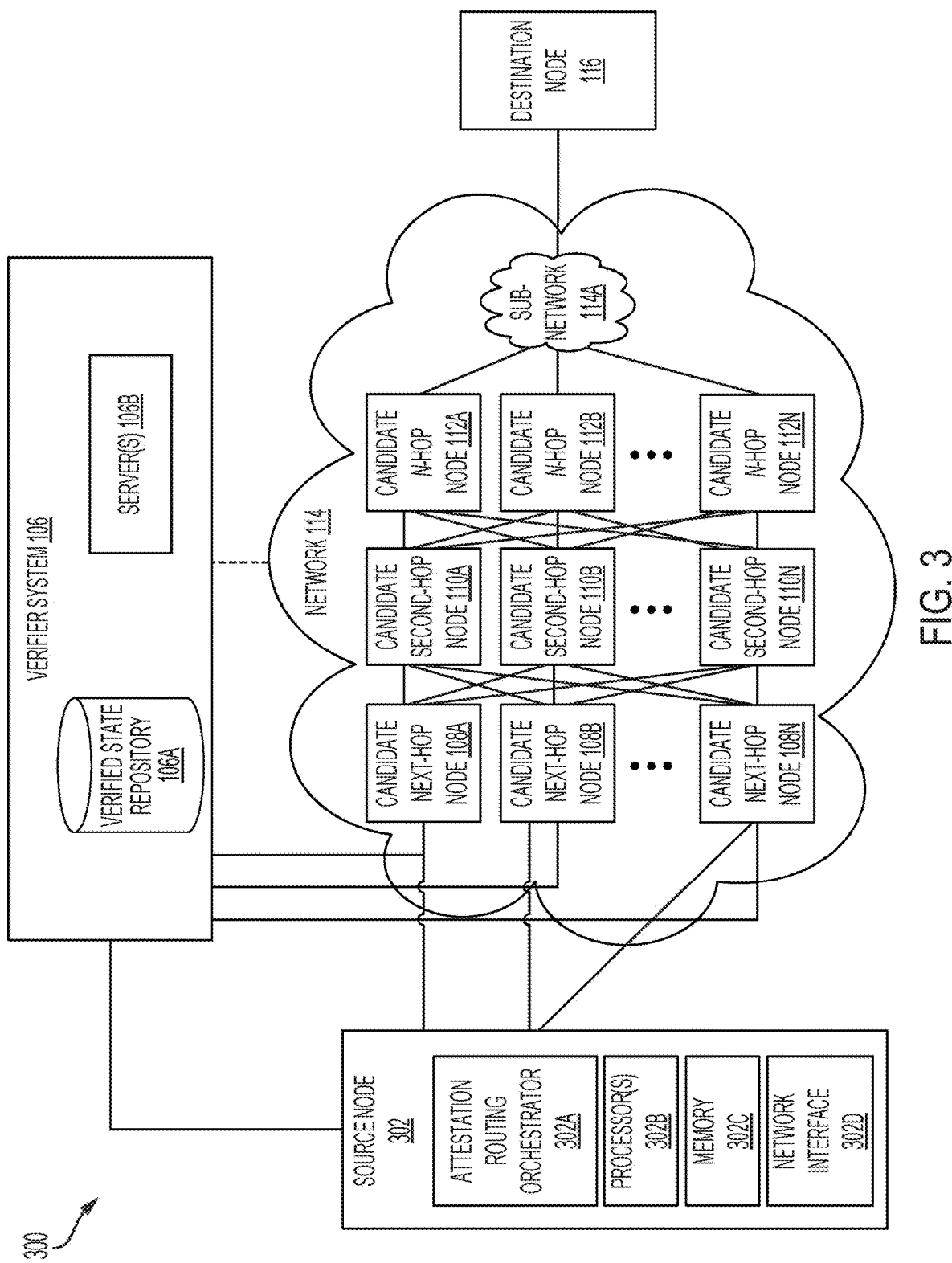
FIG. 3 is a block diagram of an example of a networking environment in accordance with some implementations.

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
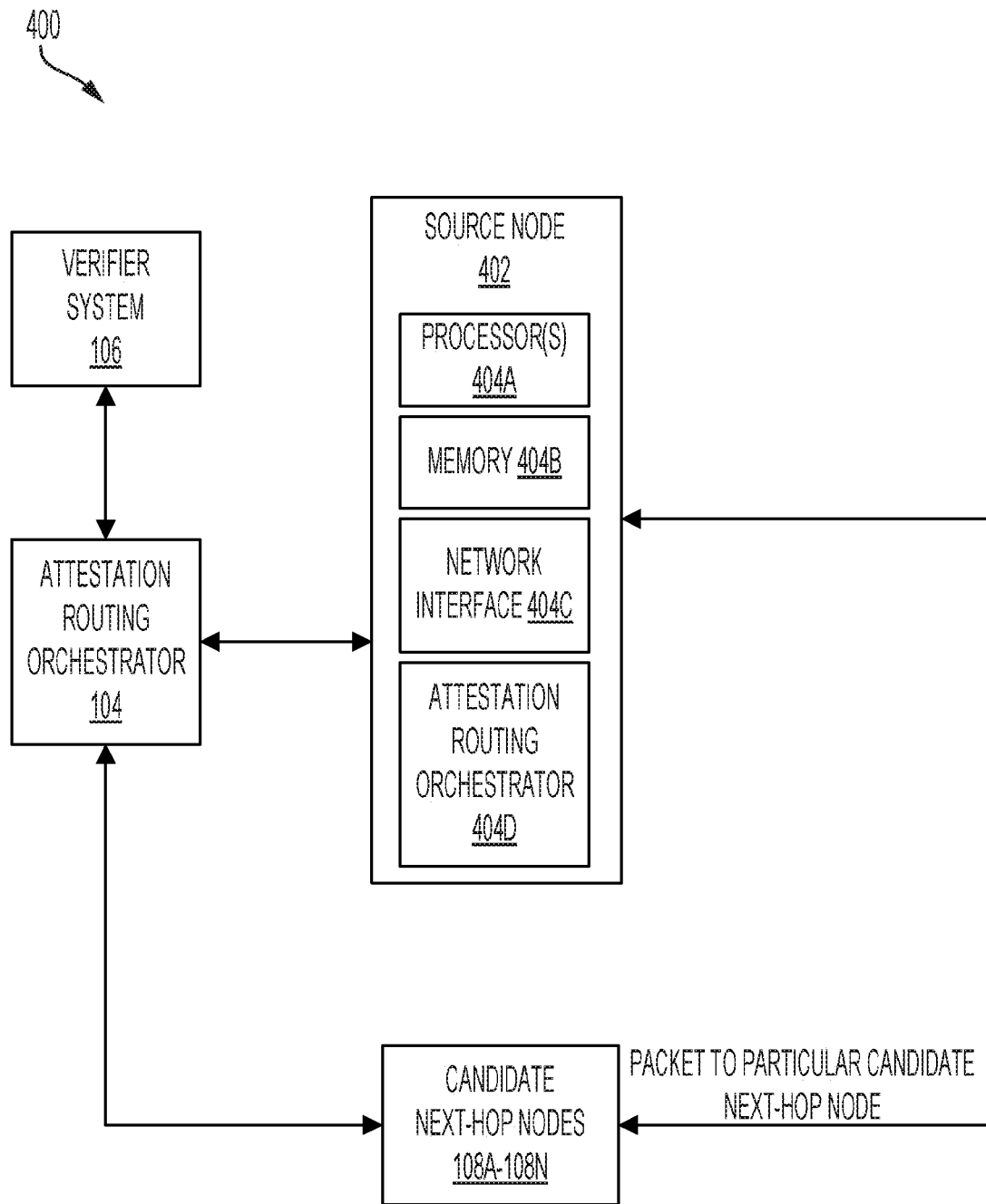
FIG. 4 is a block diagram of controller orchestrated attestation based routing in accordance with some implementations.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can direct, to the particular candidate next-hop node, a data packet destined for the destination node. For example, in some cases, the attestation routing orchestrator 104 can provide attested route information (e.g., validated canary stamp data, security measurements, etc.) to an attested route manager 402D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 402D can select a particular candidate score based on one or more selection criteria. Moreover, the attested route manager 402D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

According to some aspects, time reference signals according to time synchronization and/or time distribution protocols enhanced with attestation based Proof of Integrity are disclosed. In this disclosure, time reference signals can include time synchronization signals and/or time distribution signals.

In some examples, a source node 102 and or one or more of the candidate next-hop nodes 108A-N, 110A-N, 112A-N, etc., of a networking environment can act as time sources and/or be used for time synchronization. For example, a time synchronization protocol can include a hierarchy or chain of network nodes which can be used for propagating a time from a time source. Some nodes acting as a time source can be authenticated using authentication schemes such as a symmetric key and public key authentication, or others. However, since the identity authentication of the time source may not be sufficient because the time source could have been compromised, the disclosed techniques include attestation methods for Proof of Integrity of the time stamps or time synchronization data provided by the time sources.

The description herein includes references to some well-known time synchronization protocols to provide illustrative examples of attestation based enhancements to these protocols. However, it will be understood that the example attestation techniques discussed herein can be extended to any time synchronization scheme or protocol without limitation.

Figure 5A:
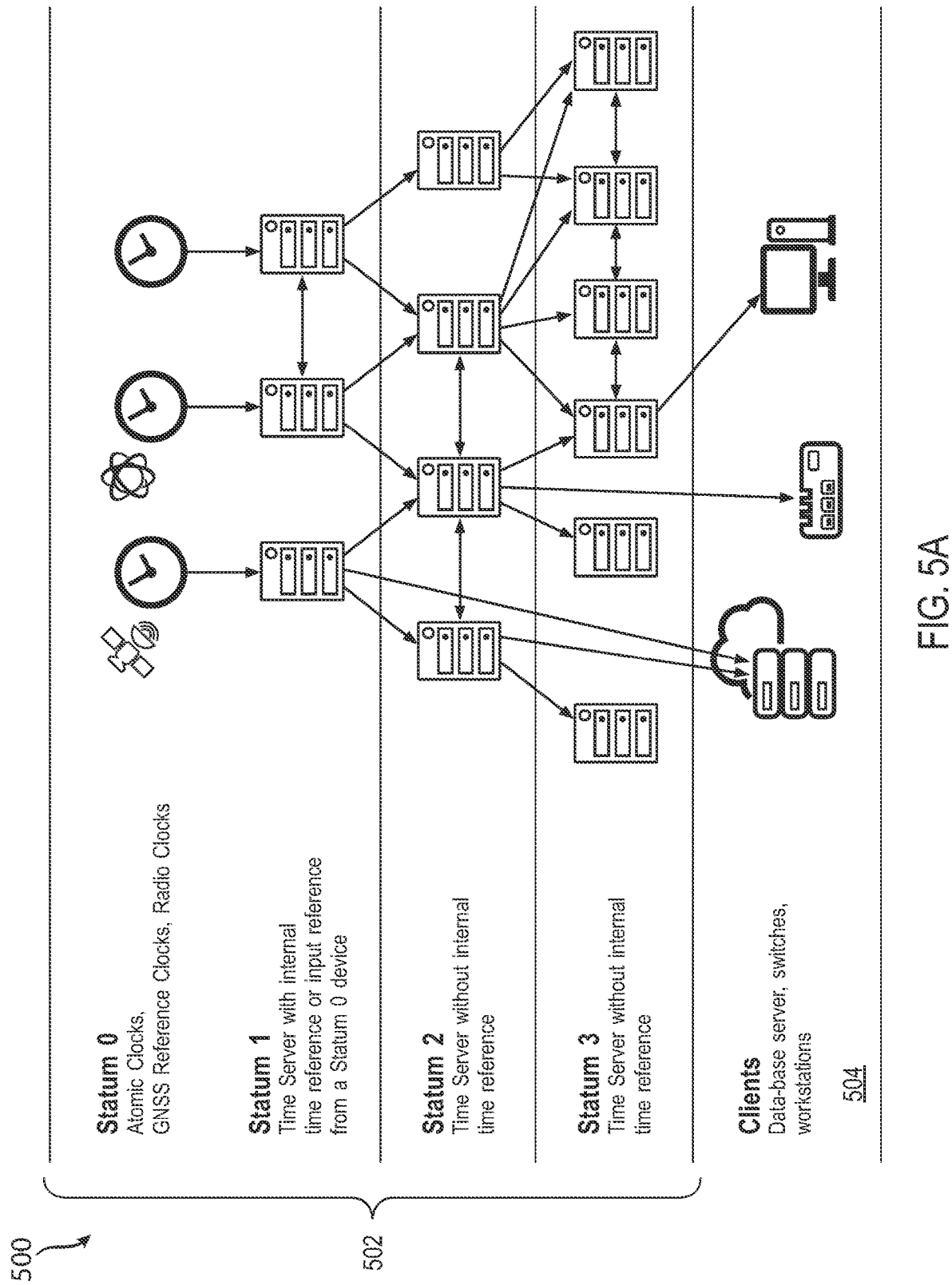
FIGS. 5A-C are block diagrams of example systems using Network Time Protocol (NTP) protocols for time synchronization and attestation, in accordance with some implementations.

FIG. 5A is a schematic diagram of a system 500 which is configured to utilize Network Time Protocol (NTP) for time or clock synchronization and/or time distribution. The NTP is a protocol for time synchronization between computer systems widely used in the Internet for synchronizing the nodes of a system such as the system 500 to a common time with high accuracy. The NTP utilizes algorithms to select accurate time servers and is designed to mitigate the effects of variable network latency. The NTP can maintain time with an accuracy of within tens of milliseconds over the public Internet, and can achieve better than a one millisecond accuracy in local area networks. The NTP can be used in systems comprising a client-server model or among peers in a peer-to-peer model where all peers are considered as a potential time source. In some implementations of NTP, timestamps can be transmitted and received using a User Datagram Protocol (UDP). In some examples, the time stamps can be broadcast or multicast, where in a client-server model, a time server may broadcast the time stamps and the clients may passively listen to time updates after an initial round-trip calibrating exchange.

In the example system 500, an NTP Stratum model is illustrated with time servers 502 in an NTP network. The time servers 502 are synchronized to a reference clock that maintains the current time according to a particular time standard. Typical candidates for reference clocks are cesium clocks which can be very expensive. Cheaper (and thus more popular) ones are receivers for some time signals broadcasted by national standard agencies. A typical example is a GPS (Global Positioning System) receiver that gets the time from satellites. These satellites in turn have a cesium clock that is periodically corrected to provide maximum accuracy. Less expensive (and accurate) reference clocks use one of the terrestrial broadcasts known as DCF77, MSF, and WWV. In NTP these time references are also named Stratum 0, the highest possible quality. Each device that has its time synchronized to some reference clock can also be a time reference for other systems, but the Stratum level increases with each synchronization. For example, the Stratum level (e.g., 0-3 as shown) of a time server indicates the time server's distance to the reference clock While the Stratum 0 can include devices (time servers) directly connected to atomic clocks, global navigation satellite system (GNSS) reference clocks, radio clocks, etc., the time servers of Stratum 0 may not distribute time over the network directly. Hence the Stratum 0 time servers are linked to a Stratum 1 time server that can distribute time to Stratum 2 servers or clients, and so on. The higher the Stratum number, the more the timing accuracy and stability degrades. For example, the Stratum 1 devices can include a time server with internal time reference or input reference from a Stratum 0 device. The Stratum 2 and Stratum 3 devices can include time servers without an internal time reference. A group of NTP time servers at the same Stratum level (e.g., Stratum) are considered NTP peers to each other, while the time servers at a higher Stratum level can be time servers for the Stratum levels with higher reference numerals. In some systems more Stratum levels with reference numerals e.g., up to 15 can be provided, although only Stratum levels 0-3 are illustrated for system 500.

In the example shown, clients 504 can synchronize their times or clocks based on time provided by one or more of the time servers 502 in the Stratum levels 0-3. The NTP clients 504 can include any computing device such as a data-base server, electronic switches, workstations, computers, etc. There are several ways for a client 504 to obtain the time from the time servers 502. For example, the time servers 502 can be polled, the time servers 502 can send their time to a peer, or the time servers 502 can multicast or broadcast the time. In some examples, synchronizing a client 504 to a time server 502 can include one or more packet exchanges where each exchange can include a request and a reply.

Figure 5B:
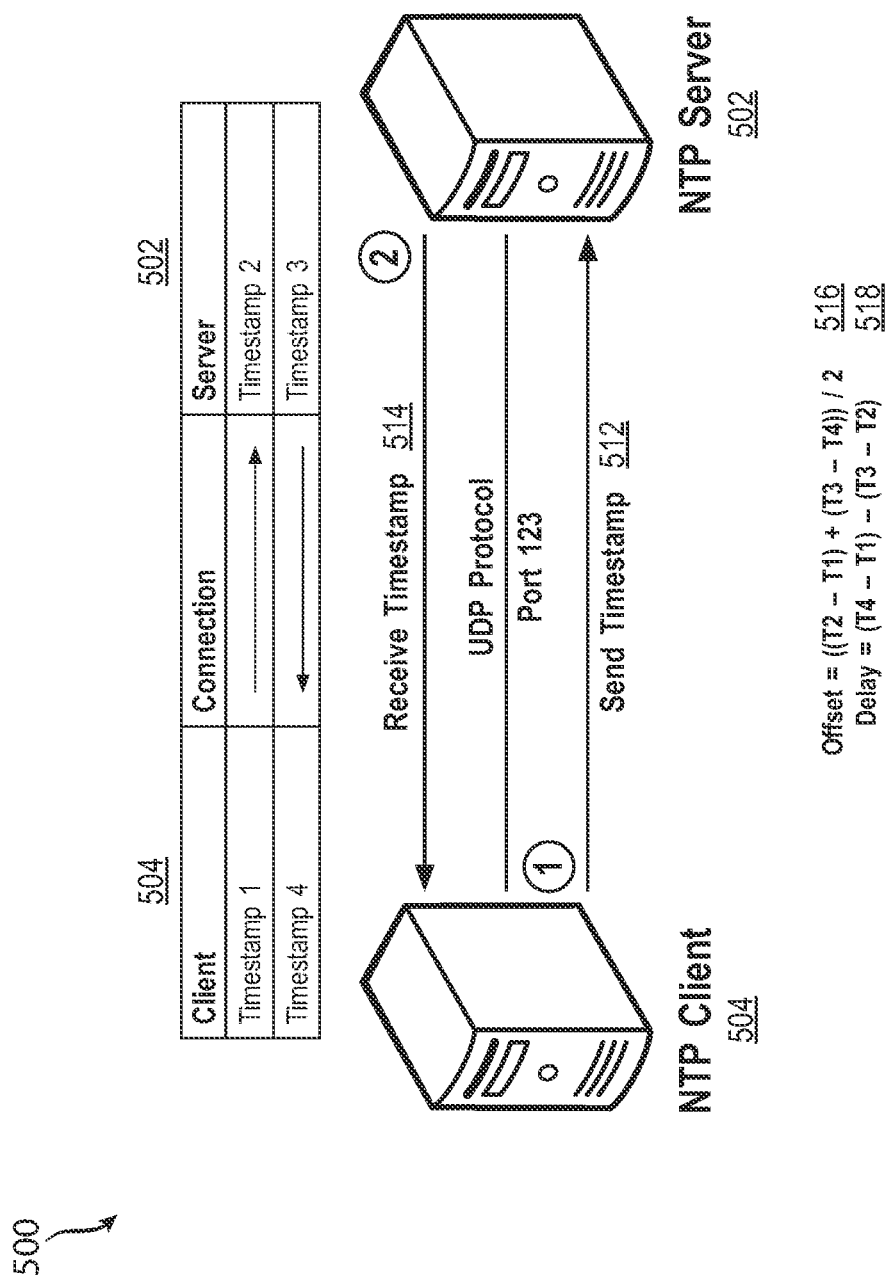

FIG. 5B illustrates an example message exchange between an NTP client 504 and an NTP time server 502 of the system 500. At step 1, the client 504 transmits a request along with its originating timestamp, origin timestamp (T1) into a packet which can be forwarded using a UDP protocol to the time server 502. When the time server 502 receives the packet, the time server 502 stores its own receipt time, receive timestamp (T2) into the packet. At step 2, the packet can be returned to the client 504 with a transmit timestamp (T3) added into the packet to indicate the time at which the packet was transmitted from the time server 504. Upon receiving the reply, the client 504 logs its own receipt time as a reference timestamp or destination timestamp (T4). The above time stamps are summarized in the table below:

| org | T1 | Origin timestamp |
|---|---|---|
| rec | T2 | Receive timestamp |
| xmt | T3 | Transmit timestamp |
| dst | T4 | Destination/reference timestamp |

Using the times T1, T2, T3, and T4 the travelling time of the packet can be estimated using equations 516-518. The travelling time delay is calculated using equation 518 as (T4−T1)−(T3−T2). A round-trip time is half of the delay minus an offset or remote processing time, assuming symmetrical delays. The time offset between the client 504 and the time server 502 is obtained by equation 516 as ((T2−T1)+(T3−T4))/2. A dispersion (maximum offset error) can also be calculated from multiple such exchanges. The current time at the client 504 is obtained from the round trip time, taking into account any dispersions. The shorter and more symmetric the round-trip time, the more accurate the estimate of the current time at the client 504 can be.

In some examples, the above-described NTP packet exchanges between the client 504 and the server 502 for requests and responses in steps 1-2 can be enhanced or new messages can be introduced to include attestation or Proof of Integrity.

Figure 5C:
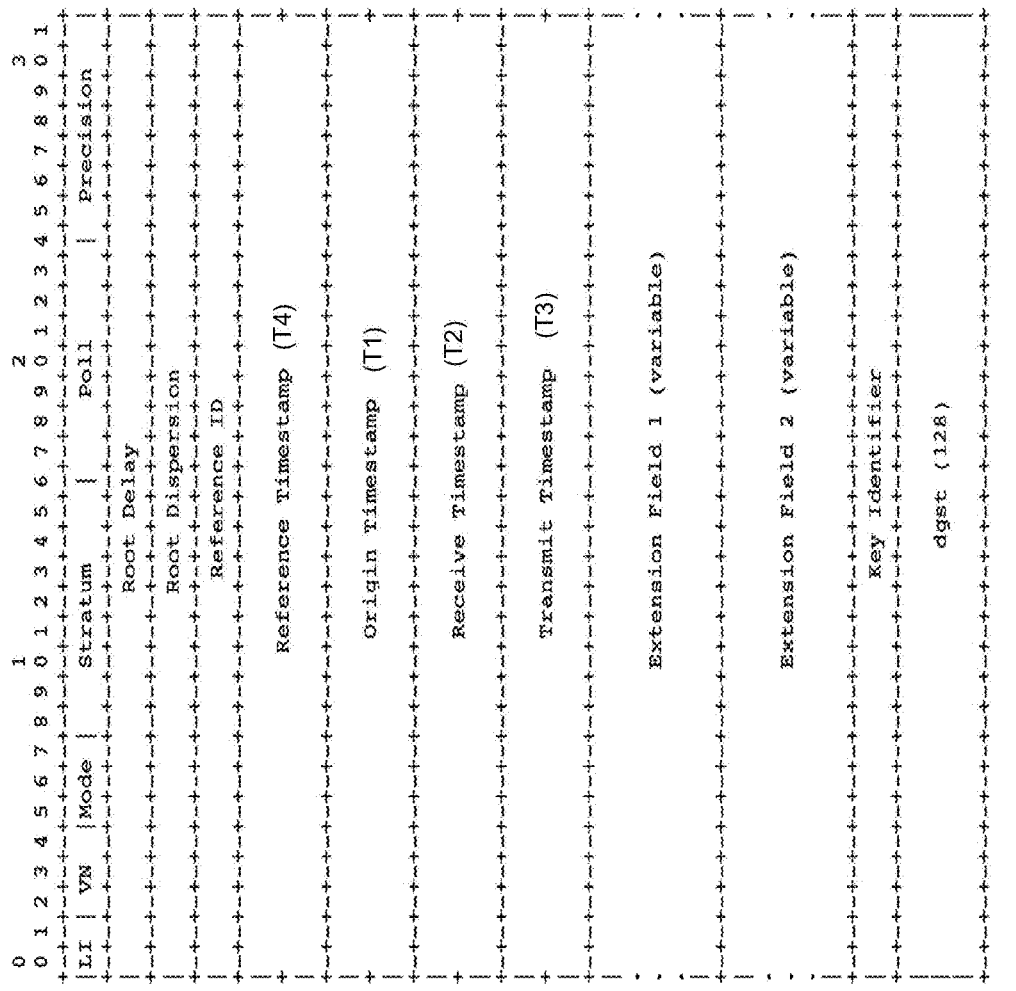

For example, FIG. 5C illustrates an example packet header 520 which can be used in the NTP packets for requests and responses in steps 1-2 of FIG. 5B. The various time stamps T1-T4 have been indicated in the packet header 520. There are several other fields which are shown in the packet header 520, such as the extension fields 1 and 2. In some aspects, one or more of these extension fields may be extended to include Proof of Integrity. In some examples, a new extension field can be added to the packet header 520 to include the Proof of Integrity. Various examples for including Proof of Integrity in existing or newly created extension fields can be consistent with the above description. For example, the Proof of Integrity can include a canary stamp or a hardware fingerprint combined with a Proof of Freshness to prevent replay attacks. For example, trustworthiness of nodes such as any of the time servers 502 in the Stratum levels shown in FIG. 5A can be verified at the client 504 using attestation techniques provided for time synchronization based on NTP using these Proof of Integrity extension fields.

In some examples, the NTP is extended to add new packet header variables to provide "Proof of Integrity". In some examples, the NTP is augmented using extension fields to carry a "Proof of Integrity" field (e.g., as a blob or container field) in messages from the NTP server node 502 and/or the NTP client node 504. The Proof of Integrity can include one or more integrity verification techniques such as the visible indicators. For example, the Proof of Integrity can include one or more of a Canary stamp or a hardware fingerprint along with a verifiable proof of possession of the hardware fingerprint.

For example a Canary stamp can be created by extracting the clock or timer in an attesting device such as a time server 502. The time server 502 can include a TPM which can incorporate the clock into a packet such as an extension field of the packet header 520. In some examples, the Canary stamp created using the clock can be hashed with information within an external TPM. The Canary stamp or a hardware fingerprint can thereby provide a non-spoofable token or metadata element, which can bind continuously incrementing time values on an NTP receiver such as the client 504 with a known external state. Any resetting of the TPM's clock would thus be visible in any subsequent TPM queries such as an NTP request for time, and any restarting of a platform is also exposed in subsequent TPM queries. Within the bounds of reset and restart, the TPM's timer continuously increments. Therefore, any push of TPM information from the client 504 which includes the timestamps mentioned above can be determined to have occurred subsequent to any previously-received measurements from the time server 502, exposing any security breaches with the integrity or freshness of the time server 502.

In some aspects, the Proof of Integrity can additionally or alternatively include a signature using a private key such as a Secure Unique Device Identification (SUDI) of the device or attestation key and fields in NTP messages. The SUDI or other hardware fingerprint can be provided by the NTP server 502 and/or the NTP client node 504 to prove authenticity of the device. For example, the SUDI can include a tamperproof identifier (ID) of the device (e.g., an NTP time server 502 at any Stratum). The tamperproof ID can be in the form of a hardware identity which is tied to a key pair in a cryptographic certificate (e.g., a secure X.509 certificate at the time of device manufacture). The SUDI credentials can be used for suitable connections with the device to prove the device's authenticity (e.g., the SUDI is compliant with connections using IEEE 802.1AR standard)

In some aspects, Proof of Freshness can also be provided by the NTP server 502 and/or the NTP client node 504 in addition to the Proof of Integrity. For example, the Proof of Freshness can be included within an extension field of the packet header 520. In some examples, the Proof of Freshness may utilize a SUDI of the device, a token based on internal counters (e.g., a clock), a nonce, and/or other techniques. For example, freshness approaches based on trusted computing capabilities of the time server 502, such as TPM, can include a token which allows the client 504 to validate freshness of the time stamps provided by the time server based on the state of internal counters within the TPM. This token can be used to detect replay attacks, and provide attestation for asynchronous push, multicast, and broadcast messages used in NTP. In some examples, a nonce can be used in the packet header 520 to define an interval from the nonce's creation time to the time that the packet is received at the client 504. The interval may indicate a time duration for which received packets are guaranteed to be fresh. Various other Proof of Freshness approaches can also be included to attest to the freshness of packets received from an authenticated time source 502. In some examples, if a time stamp is received from a time source which has been authenticated then a separate Proof of Freshness may not be necessary as a replay attack would not be possible when the time stamp corroborates the correct time provided by the time source.

Figure 6A:
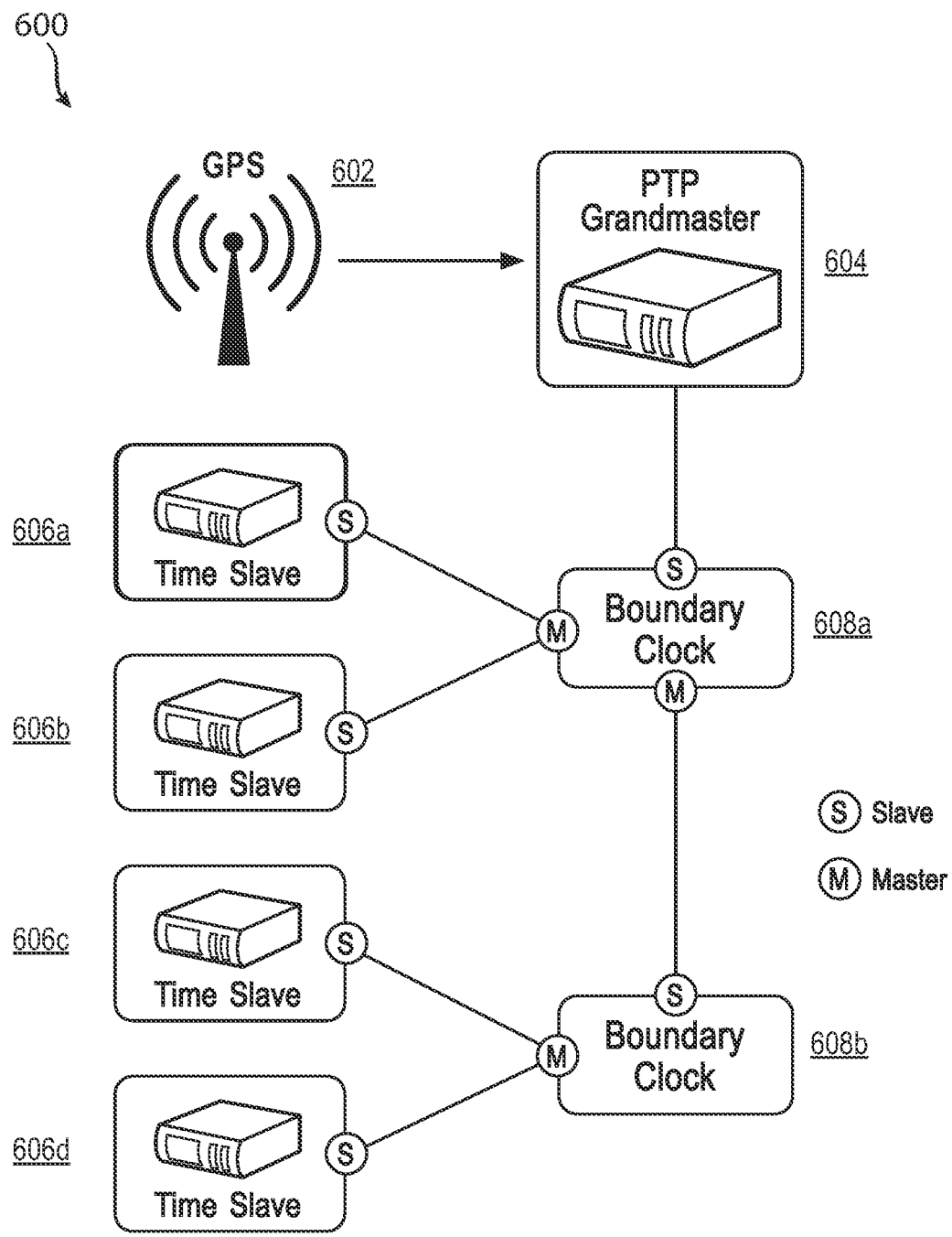
FIG. 6A is a block diagram of an example system using Precision Time Protocol (PTP) for time synchronization and attestation, in accordance with some implementations.

FIG. 6A is a schematic diagram which illustrates a network 600 configured for Precision Time Protocol (PTP) time synchronization. In some examples, PTP may be used as an alternative to the NTP time synchronization techniques discussed with reference to FIGS. 5A-C. In some examples, PTP may provide very accurate clock synchronization, in the order of sub-milliseconds accuracy. PTP techniques may be used for financial transactions, satellite navigation, and other uses where a highly precise time synchronization technique may be desirable. In some examples, the PTP may be compliant with standards such as IEEE 1588-2002 and may use UDP, similar to NTP. A PTP source can use high precision clocks which can be propagated to clients using hardware time stamping. Intermediate devices referred to as transparent clocks may be used to adjust the PTP clock values for accommodating offsets, jitter, etc., in a network using the PTP time synchronization.

In the system 600, a hierarchical master-slave architecture for clock distribution is shown (e.g., compliant with the IEEE 1588 standard). Under this architecture, a time distribution system consists of one or more communication media (network segments), and one or more clocks. An ordinary clock is a device with a single network connection. The devices can include a source/master and a destination/slave for time synchronization. For example, a global positioning system (GPS) clock 602 can be a master whose clock is used for time synchronization of one or more slaves 606a-d. One or more boundary clocks 608a-b can have multiple network connections each and can accurately synchronize one network segment to another. A synchronization master may be selected for each of the network segments in the system. For example, the boundary clock 608a may be a master for a first network segment comprising the slaves 606a-b, and the boundary clock 608b may be a master used for synchronizing a second network segment comprising the slaves 606c-d. The boundary clock 608b can be synchronized to the boundary clock 608a for synchronizing the first and the second network segments. A root timing reference is referred to as a grandmaster, which may be connected to a root clock. For example, a grandmaster 604 can be synchronized to the GPS clock 602, and transmit synchronization information to the clocks residing on its network segment, e.g., using the boundary clocks 608a-b. The boundary clocks with a presence on a segment can relay accurate time to the other segments to which they are also connected.

The PTP protocol used by the system 600 can use PTP synchronization messages for synchronizing the various clocks and the segments as discussed above. For example, synchronization and management of the PTP system 600 can use the exchange of messages across the different network segments.

For example, the synchronization messages can include a Sync, Follow_Up, Delay_Req, Delay_Resp, and other messages as defined by the standards and used by ordinary and boundary clocks to communicate time-related information for synchronizing clocks across the system 600. Messages such as a Pdelay_Req, Pdelay_Resp, Pdelay_Resp_Follow_Up, or others can be used by transparent clocks to measure delays across the communications media of the system 600 so that they can be compensated for by the system. Announce messages can be used by the best master clock algorithm in IEEE 1588-2008 to build a clock hierarchy and select the grandmaster 604. Management messages can be used by network management to monitor, configure and maintain the PTP system 600. Signaling messages can be used for non-time-critical communications between clocks. Broadly, the PTP messages can be categorized as event and general messages. Event messages are time-critical in that accuracy in transmission and receipt timestamp accuracy directly affects clock distribution accuracy. Sync, Delay_Req, Pdelay_Req and Pdelay_resp are event messages. General messages are more conventional protocol data units in that the data in these messages is of importance to PTP, but their transmission and receipt timestamps may not be. Announce, Follow_Up, Delay_Resp, Pdelay_Resp_Follow_Up, Management and Signaling messages are members of the general message class In some examples, a Proof of Integrity can be introduced in one or more PTP messages which can be event messages or general messages. In some examples, the time-critical event messages which affect clock distribution accuracy can include attestation information to convey to a receiver that the message has been transmitted from an authentic and uncompromised source. In some examples, the slaves 606a-d may be destination nodes or clients, where a border clock 608a-b or a grandmaster 604 can introduce attestation information in the event messages received by the slaves 606a-d. The attestation information can be included as a separate field or as extensions to exiting fields of the PTP messages. In some examples, the PTP messages can be enhanced with a Proof of Integrity blob or container field. In some examples the PTP messages can also include any flags to indicate the presence of Proof of Integrity, so that a receiver such as the slaves 606a-d receiving the PTP messages can be notified that attestation or Proof of Integrity has been introduced in the PTP messages.

In some examples, Proof of Freshness can be provided in PTP messages by adding a signature using a private key such as the SUDI of the source. In some examples, attestation keys and fields in the PTP messages can be used for the Proof of Freshness. For example, the Proof of freshness can be provided in PTP messages for correction. In some examples, the timestamps may be new in every message, which makes duplicate detection efficient. In some examples, a token based on a TPM of an attesting device, a nonce, a time interval, or other technique for Proof of Freshness may be used in PTP messages.

In some examples, time synchronization and/or time distribution can be based on broadcast signals. For example, DCF77, Swiss HBG, or other broadcast signals can include time reference signals. In some examples, the time reference signals can include time synchronization and/or time distribution signals configured to include attestation information according to this disclosure.

Figure 6B:
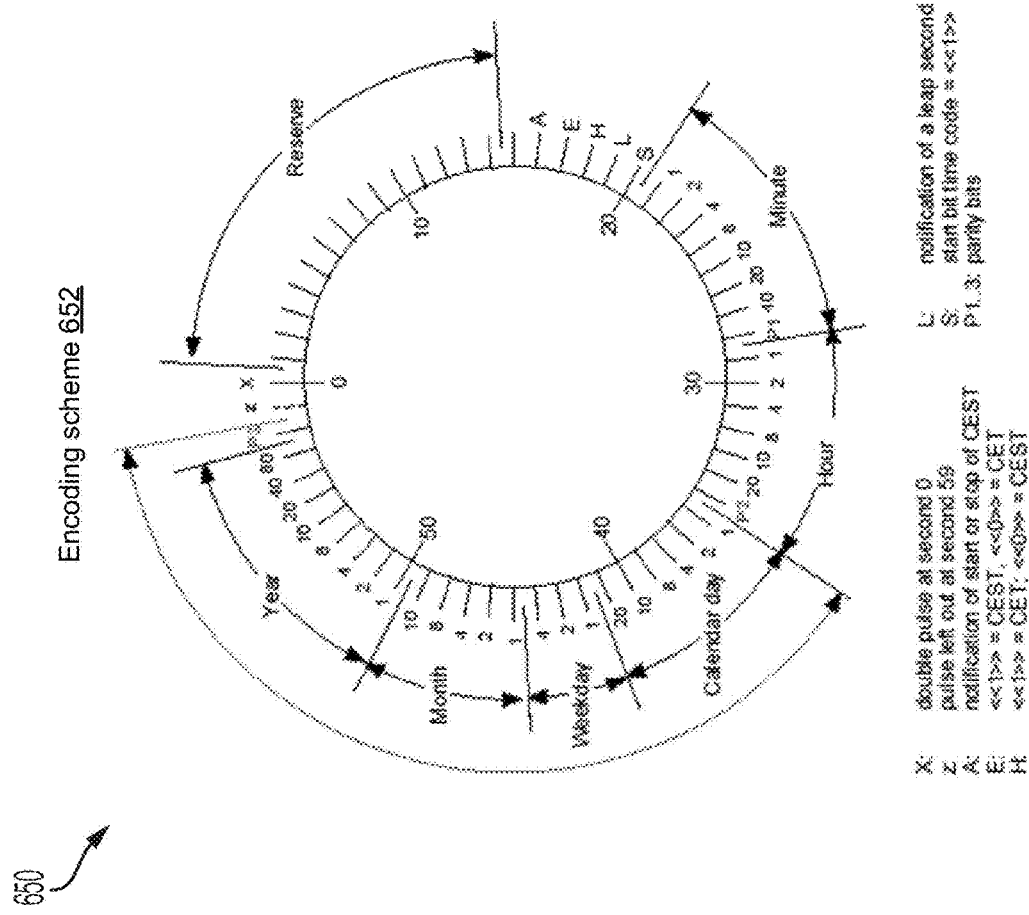
FIG. 6B is a block diagram of an example system using a DCF77 protocol for time synchronization and attestation, in accordance with some implementations.

FIG. 6B is a schematic diagram of a DCF77 time synchronization system 650 and related bit fields for encoding a time signal used by the DCF77 system. The DCF77 system 650 can use a DCF77 time signal station for transmitting an ultra-precise time mark (e.g., used in Germany) which includes a 77.5 kilohertz signal modulated by the encoded current time. This time signal can be used to adjust a computer's real-time clock and to ensure accurate calendar day and time of the system. There are two different possibilities to synchronize the system clock with the DCF77 signal. First, the system clock can be set every time a valid time information is received from the time-mark transmitter; secondly, the update can be done in predefined time periods, for example every 5 minutes.

The DCF77 signal provides a very stable frequency which is continuously modulated with the current date and time information. The encoding scheme 652 used for the DCF77 signal includes bit codes to provide date and time information, which are transmitted during the 20th and 58th second of a minute, each bit using a 1-second window. The transmitter signal is reduced to 30% of its maximum output power at the beginning of each second. This reduction lasts for 100 or 200 milliseconds to encode a bit value of 0 or 1, respectively. There is no power reduction in the 59th second; this encodes the beginning of a new minute, so that the time information transmitted during the last minute may be regarded as valid. In consequence, the encoded time information has a maximum precision of one minute. The current second can only be determined by counting the bits since the last minute gap. The following additional information is included in the DCF77 code: daylight saving time, announcement of a leap second at midnight for time adjustments, spare antenna usage and others.

The bit fields 654 indicates the number of bits and their relative positions in the DCF77 signal and the description 656 provides the information encoded in the corresponding bit fields. In some examples, a new bit field can be introduced to the set of bit fields 654, or one or more of the existing bit fields 654 can be modified or enhanced, to include Proof of Integrity of the transmitter of the DCF77 signal. In some examples, an indicator field can be provided in the bit fields 654 to indicate presence, location, and number of bits which may be used for Proof of Integrity, where the indicator field may be separate from the Proof of Integrity field. In some examples, Proof of Integrity information such as a Canary stamp or hardware fingerprint introduced in the bit fields 654 can be used for attesting a DCF77 time signal station's authenticity. In some examples, the bit fields 654 can also be modified or enhanced to include a Proof of Freshness of the DCF77 signals transmitted by the DCF77 time signal station. In some examples, if a time stamp is received from a time source which has been authenticated then a separate Proof of Freshness may not be necessary as a replay attack would not be possible when the time stamp corroborates the correct time provided by the time source.

Similar to the DCF77 used in Germany, a Swiss HBG time signal stations emits the official Swiss time on a frequency of 75 kHz from a transmitter located in Prangins near Geneva. The Swiss HBG signals use an encoding scheme that is compatible with the German DCF77 station. Similar to the DCF77, bit fields for the Swiss HBG signals can also be enhanced or modified to include attestation information for Proof of Integrity and/or Proof of Freshness. Other time synchronization schemes can include a public broadcast time, a time standard provided by GPS or other satellite system, etc. In general, any other time synchronization scheme currently known or developed in future can be enhanced or modified according to aspects herein to include attestation information for a time source. The attestation information can be used for not only proving the source's authenticity but also proof that the source has not been compromised. A client, slave, or other recipient of a time synchronization signal can use the attestation information to verify whether the time source is trustworthy and make policy decision to accept the data from the time source, reject the data, report any suspicious data, etc.

FIG. 7 illustrates a process 700 for authenticating time sources using attestation-based techniques (e.g., implemented in the systems 500, 600, 650, etc.).

At step 702, the process 600 includes receiving, at a destination device, a time reference signal from a source device, the destination device and the source device being network devices configured to communicate in a network. For example, the time reference signal can include one or more of a time synchronization signal or a time distribution signal. The source device can be a time source 502 in one of the Stratum levels of an NTP synchronization scheme implemented by the system 500. The destination device can include a client device 504 which can receive one or more NTP synchronization messages from the time source 502. In some examples using the PTP system 600, the source device can include the grandmaster 604 or a boundary clock 608a-b, and the destination devices can include slaves 606a-d. In various other time synchronization schemes, the source device and the destination device can be network devices, such as a device included in a source node 102 or one or more the candidate next-hop nodes 108A-N, 110A-N, 112A-N, destination node 116, etc., of a system 100-400 as discussed with reference to FIGS. 1-4. The source device and the destination device can both include client devices of a network in some examples. The source device can also be a device configured for transmitting a time reference signal using any other protocol such as broadcast signals for terrestrial broadcasts of time reference signals using protocols such as the DCF77, Swiss HBG, etc., with the destination device being synchronized to the time provided by the source device.

At step 704, the process 700 includes obtaining, by the destination device, attestation information from one or more fields of the time reference signal. For example, the NTP client 504 can obtain attestation information from one or more extension fields of a packet header used in NTP messages in steps 1-2 discussed with reference to FIG. 5B. For example, the time reference signal can include a time synchronization signal based on an NTP for time synchronization in the network, the one or more fields being included in one or more NTP messages, where the one or more NTP messages can include one or more of an origin timestamp, receive timestamp, transmit timestamp, or destination timestamp, the one or more fields including one or more extension fields of a packet header of the one or more NTP messages.

In some examples, the slaves 606a-d can obtain the attestation information from one or more fields of PTP messages such as the event based messages for Sync, Follow_Up, etc. In some examples, the time reference signal is based on a broadcast signal for time distribution or time synchronization in the network, the one or more fields being included in the broadcast signal.

At step 706, the process 700 includes determining, by the destination device, whether the source device is authentic and trustworthy based on the attestation information. For example, where the NTP message includes time stamps with extension fields of packet headers providing the Proof of Integrity, a destination device such as the client 504 can determine whether the time source 502 is authentic and has not been compromised. Similarly, devices obtaining PTP messages can determine Proof of Integrity of a PTP time source from respective fields contained in the PTP messages. Likewise, devices using various other protocols for time synchronization may similarly determine Proof of Integrity or other authenticity, trustworthiness information from the attestation information contained in time reference signals for the respective schemes. In some examples, the attestation information can include Proof of Integrity based on one or more of a Canary stamp or a hardware fingerprint comprising Proof of Freshness of the time synchronization signal, a Secure Unique Device Identification (SUDI) of the source device, or an attestation key.

In some examples, reliability or freshness of the time synchronization signal can be determined from on the attestation information. In some examples where time stamps are included, Proof of Freshness can be determined based on the time stamps. In other examples, a nonce, SUDI, or other information may be used in conjunction with the attestation information.

Figure 8:
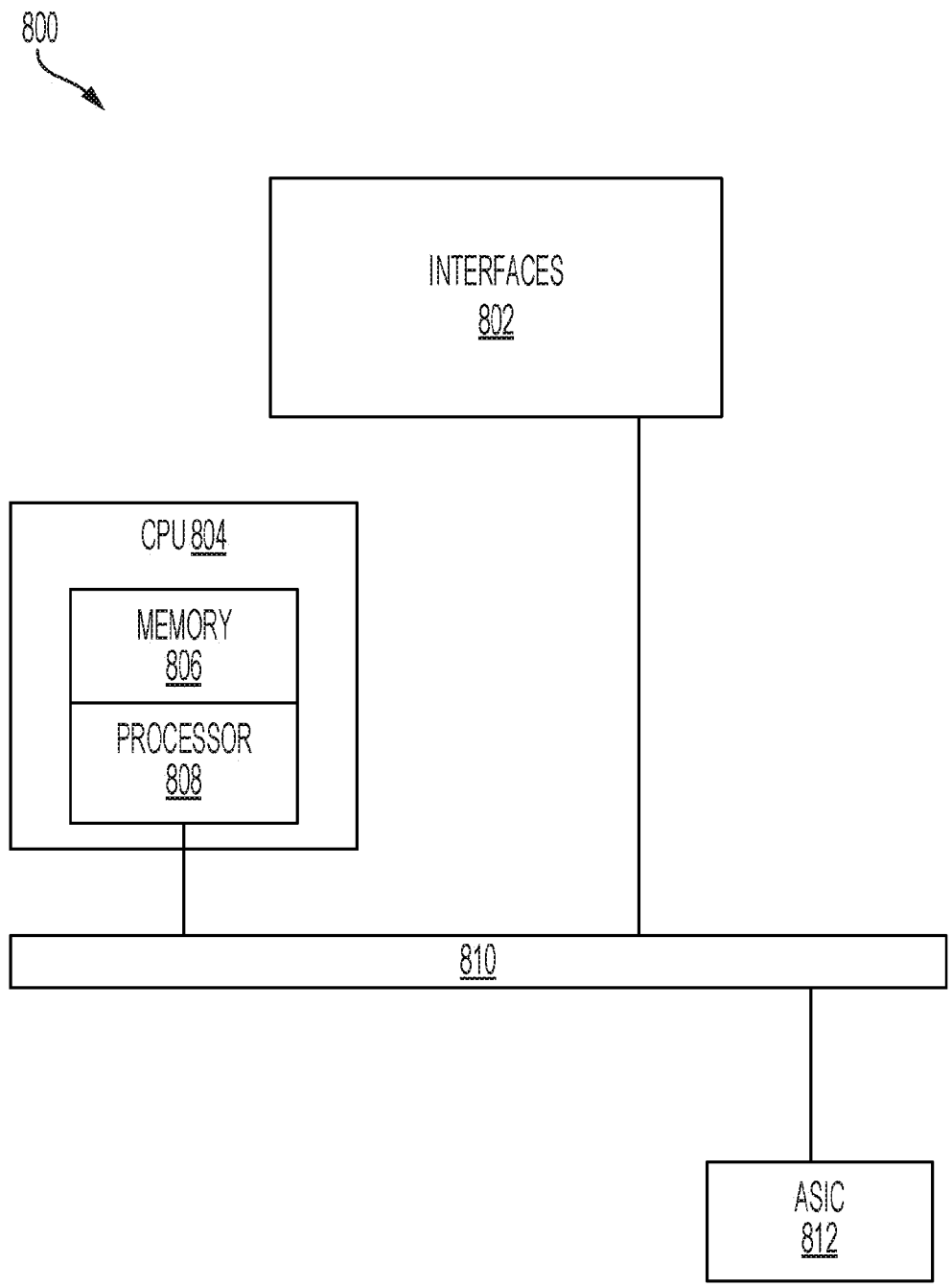
FIG. 8 illustrates an example network device in accordance with some examples.
Figure 9:
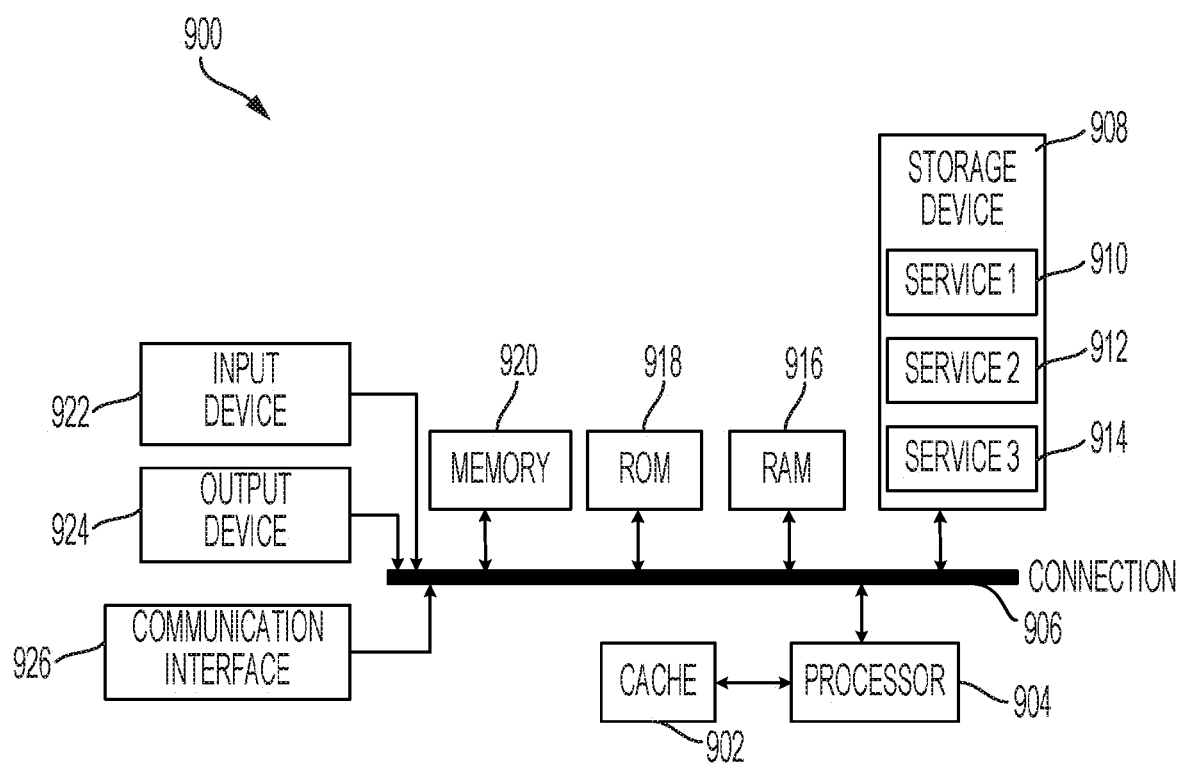
FIG. 9 illustrates an example computing device architecture in accordance with some examples.

The disclosure now turns to FIGS. 8 and 9, which illustrate example network nodes and computing devices, such as switches, routers, client devices, endpoints, servers, and so forth.

FIG. 8 illustrates an example network device 800 suitable for performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 can accomplish these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   receiving, at a destination device, a time reference signal from a source device, the destination device and the source device being network devices configured to communicate in a network;
   obtaining, by the destination device, attestation information from one or more fields of the time reference signal;
   authenticating, by the destination device, an identify of the source device; and
   verifying the trustworthiness of the time reference signal, from the time reference signal itself, based on one or more security measurements included in the attestation information as part of metadata signed by the source device.

2. The method of claim 1, further comprising:
determining freshness of the time reference signal based on the attestation information.

3. The method of claim 1, wherein the time reference signal comprises one or more of a time synchronization signal or a time distribution signal based on a Network Time Protocol (NTP) for time synchronization in the network, the one or more fields being included in one or more NTP messages.

4. The method of claim 3, wherein the one or more NTP messages comprise one or more of an origin timestamp, receive timestamp, transmit timestamp, or destination timestamp, the one or more fields including one or more extension fields of a packet header of the one or more NTP messages.

5. The method of claim 1, wherein the time reference signal comprises one or more of a time synchronization signal or a time distribution signal based on a Precision Time Protocol (PTP) for time synchronization in the network, the one or more fields being included in one or more PTP messages.

6. The method of claim 1, wherein the time reference signal is based on a broadcast signal for time distribution or time synchronization in the network, the one or more fields being included in the broadcast signal.

7. The method of claim 1, wherein the attestation information comprises Proof of Integrity based on one or more of a Canary stamp or a hardware fingerprint comprising Proof of Freshness of the time reference signal, a Secure Unique Device Identification (SUDI) of the source device, or an attestation key.

8. A system comprising:
one or more processors; and
a non-transitory computer-readable storage medium containing instructions which, when executed on the one or more processors, cause the one or more processors to perform operations including:
receiving, at a destination device, a time reference signal from a source device, the destination device and the source device being network devices configured to communicate in a network;
obtaining, by the destination device, attestation information from one or more fields of the time reference signal;
authenticating, by the destination device, an identify of the source device; and
verifying the trustworthiness of the time reference signal, from the time reference signal itself, based on one or more security measurements included in the attestation information as part of metadata signed by the source device.

9. The system of claim 8, wherein the operations further comprise:
determining freshness of the time reference signal based on the attestation information.

10. The system of claim 8, wherein the time reference signal comprises one or more of a time synchronization signal or a time distribution signal based on a Network Time Protocol (NTP) for time synchronization in the network, the one or more fields being included in one or more NTP messages.

11. The system of claim 10, wherein the one or more NTP messages comprise one or more of an origin timestamp, receive timestamp, transmit timestamp, or destination timestamp, the one or more fields including one or more extension fields of a packet header of the one or more NTP messages.

12. The system of claim 8, wherein the time reference signal comprises one or more of a time synchronization signal or a time distribution signal based on a Precision Time Protocol (PTP) for time synchronization in the network, the one or more fields being included in one or more PTP messages.

13. The system of claim 8, wherein the time reference signal is based on a broadcast signal for time distribution or time synchronization in the network, the one or more fields being included in the broadcast signal.

14. The system of claim 8, wherein the attestation information comprises Proof of Integrity based on one or more of a Canary stamp or a hardware fingerprint comprising Proof of Freshness of the time reference signal, a Secure Unique Device Identification (SUDI) of the source device, or an attestation key.

15. A non-transitory machine-readable storage medium, including instructions configured to cause a data processing apparatus to perform operations for controlling context-based access of data, the operations including:
receiving, at a destination device, a time reference signal from a source device, the destination device and the source device being network devices configured to communicate in a network;
obtaining, by the destination device, attestation information from one or more fields of the time reference signal;
authenticating, by the destination device, an identify of the source device; and
verifying the trustworthiness of the time reference signal, from the time reference signal itself, based on one or more security measurements included in the attestation information as part of metadata signed by the source device.

16. The non-transitory machine-readable storage medium of claim 15, wherein the operations further comprise:
determining freshness of the time reference signal based on the attestation information.

17. The non-transitory machine-readable storage medium of claim 15, wherein the time reference signal comprises one or more of a time synchronization signal or a time distribution signal based on a Network Time Protocol (NTP) for time synchronization in the network, the one or more fields being included in one or more NTP messages.

18. The non-transitory machine-readable storage medium of claim 17, wherein the one or more NTP messages comprise one or more of an origin timestamp, receive timestamp, transmit timestamp, or destination timestamp, the one or more fields including one or more extension fields of a packet header of the one or more NTP messages.

19. The non-transitory machine-readable storage medium of claim 15, wherein the time reference signal comprises one or more of a time synchronization signal or a time distribution signal based on a Precision Time Protocol (PTP) for time synchronization in the network, the one or more fields being included in one or more PTP messages.

20. The non-transitory machine-readable storage medium of claim 15, wherein the attestation information comprises Proof of Integrity based on one or more of a Canary stamp or a hardware fingerprint comprising Proof of Freshness of the time reference signal, a Secure Unique Device Identification (SUDI) of the source device, or an attestation key.

* * * * *